United States Patent
Nopper

(10) Patent No.: US 6,758,401 B2
(45) Date of Patent: Jul. 6, 2004

(54) METHODS FOR OPERATING A CODE READER, AND A CODE READER

(75) Inventor: Richard Nopper, Gutach (DE)

(73) Assignee: Sick AG, Waldkirch (DE)

(*) Notice: Subject to any disclaimer, the term of this patent is extended or adjusted under 35 U.S.C. 154(b) by 0 days.

(21) Appl. No.: 10/289,205

(22) Filed: Nov. 7, 2002

(65) Prior Publication Data

US 2003/0098348 A1 May 29, 2003

(30) Foreign Application Priority Data

Nov. 7, 2001 (DE) .......................................... 101 54 679

(51) Int. Cl.$^7$ ................................................. G06K 7/10
(52) U.S. Cl. .................................. 235/462.29; 235/454
(58) Field of Search ............................. 235/454, 462.29

(56) References Cited

U.S. PATENT DOCUMENTS

| | | | |
|---|---|---|---|
| 5,648,649 A | 7/1997 | Bridgelall et al. | |
| 6,082,619 A | 7/2000 | Ma et al. | |
| 2002/0043561 A1 * | 4/2002 | Tsikos et al. | ............... 235/454 |

FOREIGN PATENT DOCUMENTS

| | | |
|---|---|---|
| DE | 199 24 519 A1 | 10/2000 |
| DE | 100 09 493 A1 | 8/2001 |
| EP | 0 746 067 A1 | 12/1996 |

OTHER PUBLICATIONS

W. T. Tsang, "Heterostructure Semiconductor Lasers Prepared by Molecular Beam Epitaxy", IEEE Journal of Quantum Electronics, vol. QE–20, No. 10, Oct. 1984, pp. 1119–1132.

Daoqi Yu, et al., "Speckle Noise in Laser Bar–Code–Scanner Systems", Applied Optics, vol. 35, No. 19, Jul. 1, 1996, pp. 3687–3694.

* cited by examiner

*Primary Examiner*—Mark Tremblay
(74) *Attorney, Agent, or Firm*—Foley & Lardner LLP

(57) ABSTRACT

A method for operating a code reader and a code reader. According to the method, laser light is transmitted from a laser light source to illuminate an object having a code, wherein the laser light is amplitude-modulated to reduce the speckle noise of the light illuminating the object. Reflected or re-emitted light from the object is received by a light receiver. According to the code reader, the code reader includes a light transmitter having a laser light source adapted for transmitting laser light to illuminate an object having a code. The code reader also includes a light receiver arranged for receiving reflected or re-emitted light from the object and for producing electrical signals corresponding to the received light. The code reader also includes a modulation apparatus that modulates the laser light source such that amplitude-modulated light can be transmitted from the laser light source to the object.

14 Claims, 1 Drawing Sheet

METHODS FOR OPERATING A CODE READER, AND A CODE READER

CROSS-REFERENCE TO RELATED PATENT APPLICATIONS

The right of priority is claimed based on Federal Republic of Germany Priority Application 101 54 679.3, filed Nov. 7, 2001, the entire disclosure of which, including the specification, drawings, claims and abstract, is incorporated herein by reference.

FIELD OF THE INVENTION

The invention relates to a method for operating a code reader and to a code reader for carrying out this method.

BACKGROUND OF THE INVENTION

Code readers use various principles for reading a code, such as, for example, a one-dimensional bar code or a two-dimensional matrix code.

In code readers which operate on the scanner principle, the code is read by moving a light beam, referred to as a "moving beam," over the object to be scanned, for example, a label with a barcode. A laser beam is typically used as the light source due to its good focusing and intensity characteristics. The light reflected and/or re-emitted from the object is received by a light receiver, and is converted to electrical signals. The barcode information is derived from the amplitude information contained in the electrical signals.

Two-dimensional codes are generally read using code readers which operate on the camera principle. In this case, the object to be scanned is illuminated with a light fan, which has a cross section in the form of a line, or with area illumination. The light which is reflected and/or re-emitted from the illuminated object is imaged on a one-dimensional or two-dimensional receiver array, such as a charge coupled device (CCD) or complimentary metal oxide semiconductor (CMOS) line or matrix sensor. The code information can be obtained by evaluating the differences between the reception amplitudes of the various received pixels.

In all code reader applications, incorrect amplitude information acts as a disturbance variable in the identification of the code information. When using laser light, an additional disturbance variable occurs, i.e., "speckle noise" as described in U.S. Pat. No. 6,082,619. When laser light illuminates a white surface, a speckle pattern can be produced in the light spot due to the high coherence of the laser light and to interference between the light waves which are scattered at various points on the white surface. The speckle noise due to this speckle pattern acts as disturbing amplitude noise in the light receiver.

In another context, namely for the optical reproduction of images using a projection method based on lasers, it is known that a speckled pattern occurring during the imaging process may be reduced by pulsing the laser light source (see DE 199 24 519 A1). Pulsed laser light has a shorter coherence length, so that the formation of speckles is reduced.

SUMMARY OF THE INVENTION

According to one aspect of the invention, there is provided a code reader. The code reader comprises: a light transmitter having a laser light source adapted for transmitting laser light to illuminate an object having a code; and a light receiver arranged for receiving reflected or re-emitted light from the object and for producing electrical signals corresponding to the received light; and a modulation apparatus that modulates the laser light source such that amplitude-modulated light is transmitted from the laser light source to the object.

According to another aspect of the invention, there is provided a method for operating a code reader. The method comprises: modulating a laser light source to provide amplitude-modulated laser light; transmitting the amplitude-modulated laser light from the laser light source to illuminate an object having a code, wherein the amplitude-modulated laser light reduces the speckle noise of the light illuminating the object; and receiving reflected or re-emitted light from the object by a light receiver.

Further objects, features and advantages of the present invention will become apparent from the detailed description of preferred embodiments that follows, when considered together with the accompanying figures of drawing.

BRIEF DESCRIPTION OF THE DRAWINGS

The invention will be explained in detail in the following text with reference to several exemplary embodiments and with reference to the drawings, in which.

DETAILED DESCRIPTION OF PREFERRED EMBODIMENTS

Figure 1:
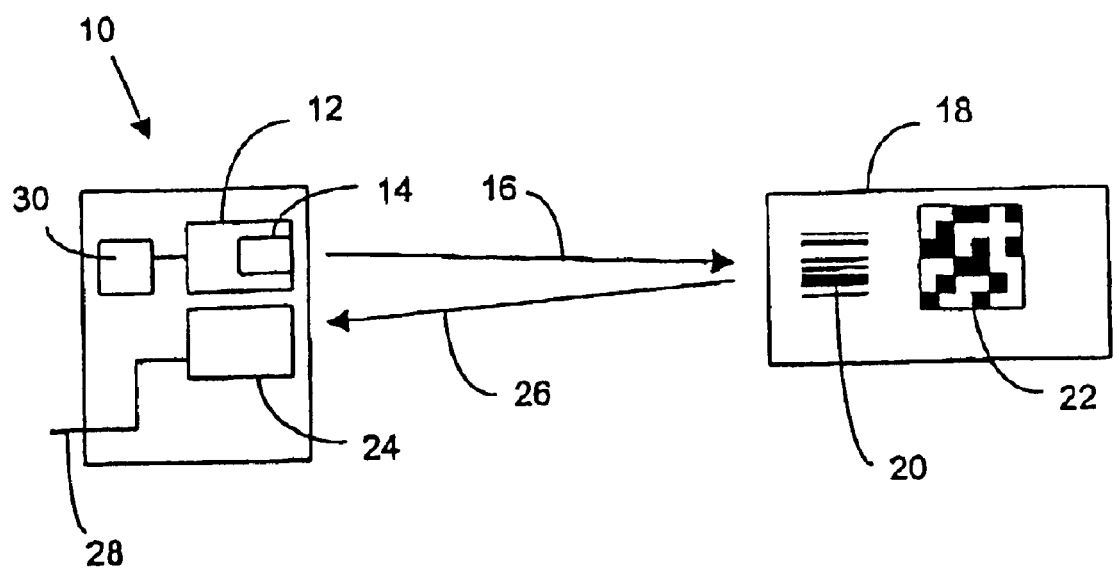
FIG. 1 shows a schematic illustration of a device for reading codes according to one embodiment of the invention.

An improved method for operating a code reader, and a corresponding code reader which allows the code to be read more quickly and has a greater depth of focus is now described.

According to one embodiment of the invention, the laser light which is transmitted from a laser light source and illuminates an object to be scanned is amplitude modulated. Thus, the coherence length of the laser light is deliberately reduced so that the reflected and/or re-emitted light produces less speckle patterns, and speckle noise is reduced. The reduced speckle noise is used in a particularly advantageous manner in the case of code readers, because the reduced noise allows very high speed cameras (such as CCD or CMOS cameras) to be used.

Speckle noise has not been a major problem in previous code reader applications. For example, U.S. Pat. No. 6,082,619 does not describe speckle noise in any great detail. This is due to the fact that in previous applications the illumination time was relatively long and any speckle patterns that might have been produced during the illumination time disappear when integrated over time, or their effect was at least reduced.

Since embodiments of the invention reduce the speckle noise in code readers, it is also possible to use very high speed cameras as light receivers. Thus, the code reader can operate at a higher frequency.

Furthermore, the reduction in the speckle noise as a result of amplitude modulation of the laser light provides the advantage that smaller apertures can be used. Thus, greater depths of focus can be achieved, which is a considerable advantage for a code reader, because the greater depth of focus enlarges the reading zone. An appropriate aperture size measured in terms of the numerical aperture may be, for example, on the order of 0.05.

The modulation frequency of the laser light amplitude is preferably more than about 5 times the operating frequency of the code reader. The operating frequency is governed by the process for scanning the object. The lower limit for the modulation frequency is governed by the need to ensure that the light receiver in the code reader does not measure the modulation frequency. However, the modulation frequency is preferably very much greater than the operating frequency, for example, one order of magnitude greater than it. A frequency of more than 100 MHz has been found to be advantageous as the modulation frequency.

In addition to a light transmitter for transmitting the laser light and a light receiver for receiving the light, a code reader according to one embodiment of the invention has a modulation apparatus, which can modulate the laser light source so that amplitude-modulated light can be transmitted. The modulation apparatus need not be physically separated from the light transmitter, but may be an integral component of electronics for the light transmitter. It would also be feasible for modulation of the laser light source to be implemented by integrated software. In this case, the laser light is modulated by program instructions which act on already existing devices. The expression "modulation apparatus" should be understood as not necessarily requiring a separate unit.

In order to ensure that the light receiver does not read the modulation frequency, the cut-off frequency of the light receiver should preferably be lower than the modulation frequency.

A laser diode is preferably used as the laser light source, since the diode can be varied relatively easily by modulation of the diode current.

The speckle noise is reduced particularly effectively if, when operating the laser diode, the modulation extends into a nonlinear region of the laser diode characteristic.

According to one embodiment of the invention, a light beam fan whose cross section is in the form of a line is provided, so that a code is well illuminated along a line, as is described in DE 100 09 493 A1, the disclosure of which is hereby incorporated by reference.

In this case, it is preferable for the light receiver to have a one-dimensional receiver array, in order to make it possible to image the illuminated light completely on the receiver array.

The method and code reader according to embodiments of the invention not only advantageously make it possible to read one-dimensional and two-dimensional barcodes, but also other codes, such as a color code for example.

FIG. 1 illustrates a device for reading a code according to an embodiment of the invention. The device has a code reader 10, which has a light transmitter 12 with a laser light source 14 for transmitting a laser light beam 16. An object 18 to which a code 20 or 22 has been applied is illuminated with the laser light beam 16. The code may be a one-dimensional barcode, as is illustrated schematically by the reference symbol 20, or a two-dimensional code, as is illustrated schematically by the reference symbol 22. Additionally, other codes, for example color codes, are possible. In order to make it possible to illuminate the code 20 or 22 completely with the laser beam 16, the code reader 10 may have a light deflection apparatus (not shown), so that the laser beam 16 can be scanned over the code 20 or 22.

The laser light beam 16 may be focused in the form of a line on the object 18, so that, in the case of the one-dimensional code 20, the code 20 can be illuminated over its entire length. In the case of the two-dimensional code 22, the code can be completely scanned by the light beam 16, which is in the form of a line.

The code reader 10 also includes a light receiver 24, which receives the light 26 reflected and/or re-emitted from the object 18. The light receiver 24 contains suitable optics for this purpose. The received light is converted in the light receiver 24 to an electrical signal, which is available at an output 28 for further processing. As mentioned above, an appropriate aperture size for the code reader 10 measured in terms of the numerical aperture may be, for example, on the order of 0.05. Thus, greater depths of focus can be achieved, which is a considerable advantage for a code reader, because the greater depth of focus enlarges the reading zone.

If the laser beam 16 is focused in the form of a line on the object 18, the light receiver 24 preferably comprises a one-dimensional receiver array, which is not illustrated in any more detail, in order to make it possible to image an area illuminated in the form of a line completely on the receiver 24. The receiver array may comprise a CCD or CMOS line sensor or matrix sensor, for example.

Appropriate evaluation of the received light or of the electrical signals, in order to decode the code 20 or 22, can be carried out in the code reader 10 or in an evaluation unit (not shown) which is connected to the output 28.

According to one preferred embodiment of the invention, the code reader 10 has a modulation apparatus 30 that modulates the laser light source 14 in the laser transmitter 12 such that the transmitted laser light 16 is amplitude-modulated in the desired manner.

A laser diode is preferably used as the laser light source 14 which can be modulated. The laser light source may be modulated, for example, with a modulation frequency of about 100 MHz. The code reader 10 has a typical operating frequency of 20 kHz. The modulation frequency should be at least about 5 times the operating frequency of the code reader 10, and should preferably be very much greater than the operating frequency. Matched to the operating frequency, the time constant of the light receiver 24 should be very much greater than the modulation frequency.

Figure 2:
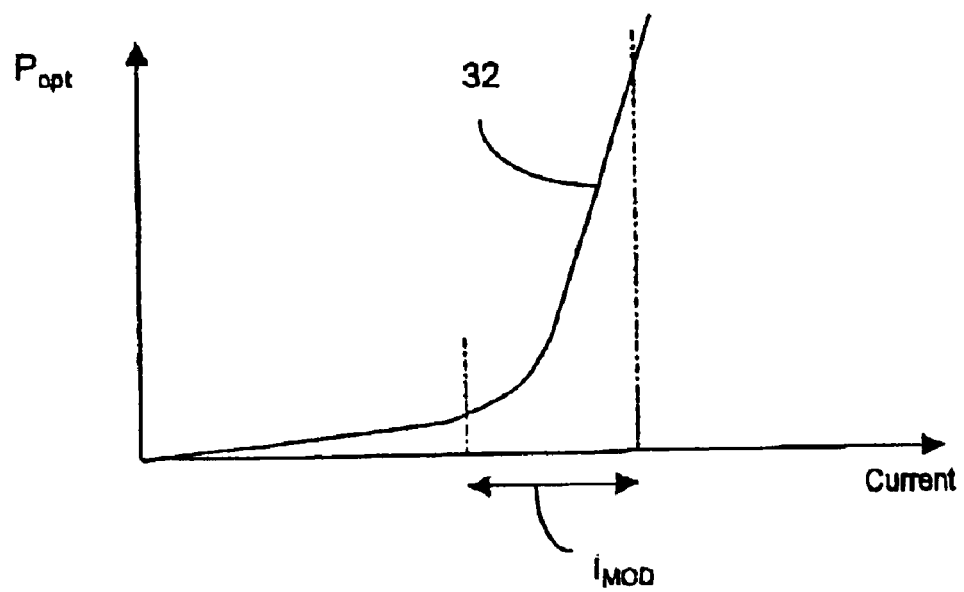
FIG. 2 shows a typical laser diode characteristic.

The laser light source 14, when in the form of a laser diode, may be modulated, for example, by modulating the current to the laser diode on the basis of a typical laser diode characteristic 32 as is illustrated in FIG. 2, in a range $I_{MOD}$, so that the light power $P_{opt}$ of the laser diode varies corresponding to the characteristic 32. The region $I_{MOD}$ extends to a region (the lower current portion in FIG. 2) in which the laser diode characteristic 32 has a nonlinear profile.

The modulation reduces the coherence length of the transmitted laser light 16, and thus ultimately reduces the speckle noise.

The laser light source 14 may transmit laser light at widely differing wavelengths, which may extend from the infrared band via the visible band to the ultraviolet band.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for operating a code reader, comprising:
   modulating a laser light source to provide amplitude-modulated laser light;
   transmitting the amplitude-modulated laser light from the laser light source to illuminate an object having a code, wherein the modulation frequency is greater than about 100 MHz, and wherein the amplitude-modulated laser light reduces the speckle noise of the light illuminating the object; and
   receiving reflected or re-emitted light from the object by a light receiver.

2. The method as claimed in claim 1, wherein a modulation frequency of the laser light source is more than about 5 times an operating frequency of the code reader.

3. The method as claimed in claim 2, wherein the modulation frequency is more than one order of magnitude greater than the operating frequency.

4. A method for operating a code reader, comprising:
   modulating a laser light source to provide amplitude-modulated laser light;
   transmitting the amplitude-modulated laser light from the laser light source to illuminate an object having a code, and wherein the amplitude-modulated laser light reduces the speckle noise of the light illuminating the object; and
   receiving reflected or re-emitted light from the object by a light receiver, wherein a modulation frequency of the laser light source is more than about 5 times an operating frequency of the code reader and the modulation frequency is about 100 MHz.

5. A method for operating a code reader, comprising:
   modulating a laser light source to provide amplitude-modulated laser light;
   transmitting the amplitude-modulated laser light from the laser light source to illuminate an object having a code, and wherein the amplitude-modulated laser light reduces the speckle noise of the light illuminating the object; and
   receiving reflected or re-emitted light from the object by a light receiver, wherein a modulation frequency of the laser light source is more than about 5 times an operating frequency of the code reader and the operating frequency of the code reader is about 20 kHz.

6. A method for operating a code reader, comprising:
   modulating a laser light source to provide amplitude-modulated laser light;
   transmitting the amplitude-modulated laser light from the laser light source to illuminate an object having a code, and wherein the amplitude-modulated laser light reduces the speckle noise of the light illuminating the object; and
   receiving reflected or re-emitted light from the object by a light receiver, and an aperture size for the code reader measured in terms of the numerical aperture is on the order of 0.05.

7. A code reader comprising:
   a light transmitter having a laser light source adapted for transmitting laser light to illuminate an object having a code; and
   a light receiver arranged for receiving reflected or re-emitted light from the object and for producing electrical signals corresponding to the received light; and
   a modulation apparatus that modulates the laser light source such that amplitude-modulated light is transmitted from the laser light source to the object, wherein the modulation apparatus modulates the laser light source at a modulation frequency greater than about 100 MHz.

8. The code reader as claimed in claim 7, wherein an upper cut-off frequency of the light receiver is considerably lower than the modulation frequency.

9. The code reader as claimed in claim 7, wherein the laser light source comprises a laser diode.

10. The code reader as claimed in claim 9, wherein the modulation apparatus modulates the laser diode in a region including a nonlinear region of the laser diode characteristic.

11. The code reader as claimed in claim 7, wherein the laser light source transmits the laser light as a light fan with a cross section in the form of a line.

12. The code reader as claimed in claim 11, wherein the light receiver comprises one of a one-dimensional receiver array and a multidimensional receiver array.

13. A code reader comprising:
    a light transmitter having a laser light source adapted for transmitting laser light to illuminate an object having a code; and
    a light receiver arranged for receiving reflected or re-emitted light from the object and for producing electrical signals corresponding to the received light; and
    a modulation apparatus that modulates the laser light source such that amplitude-modulated light is transmitted from the laser light source to the object wherein the operating frequency of the code reader is about 20 kHz.

14. A code reader comprising:
    a light transmitter having a laser light source adapted for transmitting laser light to illuminate an object having a code; and
    a light receiver arranged for receiving reflected or re-emitted light from the object and for producing electrical signals corresponding to the received light; and
    a modulation apparatus that modulates the laser light source such that amplitude-modulated light is transmitted from the laser light source to the object wherein an aperture size for the code reader measured in terms of the numerical aperture is on the order of 0.05.

* * * * *